May 27, 1958  J. P. SEIDER  2,836,787
CONDENSER DISCHARGE WELDING SYSTEM
Filed May 10, 1956
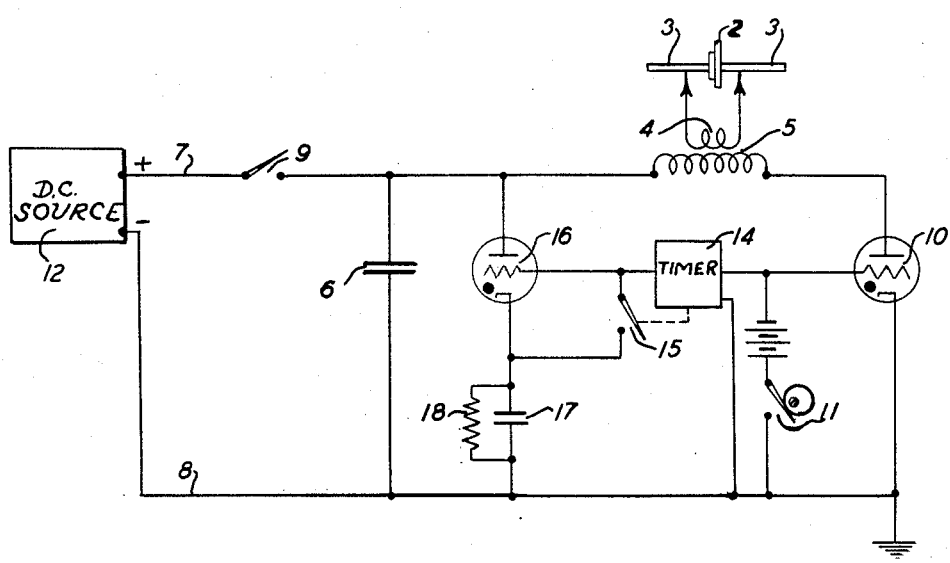
INVENTOR
J. P. SEIDER
BY
*W. C. Parnell*
ATTORNEY

United States Patent Office 2,836,787  
Patented May 27, 1958

2,836,787

CONDENSER DISCHARGE WELDING SYSTEM

John P. Seider, Rockford, Ill., assignor to Western Electric Company, Incorporated, New York, N. Y., a corporation of New York Application May 10, 1956, Serial No. 583,965

2 Claims. (Cl. 323—18)

This invention relates to a welding system and particularly to a condenser discharge system in which a controlled impulse of electrical energy is discharged through a welding load. In such welding systems a pair of electrodes are closed into contact with the article to be welded, and after the electrical energy has been discharged therethrough, the electrodes are opened or removed from the welded article. In order to prevent arcing between the electrodes and the welded article or the burning of the electrodes on the completion of the weld, it has been necessary to delay the opening of the electrodes until the current through the welding load has decayed or been reduced to zero.

It is an object of the present invention to provide a condenser discharge welding system in which the welding current through the load can be accurately controlled and cut off abruptly before the complete discharge of the condenser thereby permitting the safe removal of the welding electrodes in a reduced time.

In a conventional condenser discharge welding system having a condenser connected across the primary winding of a welding transformer, applicant has provided a shunting circuit for the transformer which becomes effective a timed interval after the discharge of the condenser to abruptly stop supplying energy to the transformer and load. The shunt circuit includes a second condenser having a large capacitance compared to the other, so that when the shunt circuit is closed, most of the remaining charge in the smaller condenser is transferred to the larger one, the reduced potential across the smaller condenser sharply reducing the current flow through the transformer and load.

These and other features of the invention will be more fully understood from the following detailed description taken in conjunction with the accompanying drawing showing a condenser discharge welding system incorporating the features of the invention.

In the circuit shown in the drawing, welding electrodes 3 are connected across the secondary winding 4 of a welding transformer 5, the primary of which is energized by the discharge of a condenser 6. The condenser 6 is charged through leads 7 and 8, which are connected to the positive and negative output terminals, respectively, of a D. C. source 12 when a switch 9 in lead 7 is closed. An electron switching device such as a gaseous discharge tube 10 is serially connected with the condenser 6 and the primary winding of the transformer 5, the tube 10 being ignited or rendered conductive on the closure of a switch 11, operable in a well-known manner by the closure of the electrodes 3 on the work 2. Closure of the switch 11 completes the biasing circuit for the tube 10 and, in addition, closes the energizing circuit for a timer 14. When tube 10 ignites, condenser 6 discharges through the transformer 5, and welding current flows through the electrodes and the work. At a predetermined time during the discharge of condenser 6, which may be adjusted to any desired value, timer 14 closes its contacts 15 to ignite or render conductive a second electron switching device such as a gaseous discharge tube 16, which together with a condenser 17, is shunted across the primary winding of the transformer and the tube 10. Condenser 17 is of large capacitance compared to that of condenser 6 (for example, one thousand microfarads as compared to twenty-four microfarads) so that when the tube 16 conducts, most of the remaining charge on condenser 6 will be transferred to the substantially larger condenser 17, thereby giving an abrupt cut off point to the welding cycle due to the resulting decrease in potential across the condenser. A resistor 18 is connected across the condenser 17 to permit discharging the transferred energy. The timer may be set to any value required for a particular welding load so that the amount of welding energy passed through the electrodes may be accurately controlled whereby burning of the electrodes is prevented.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a condenser discharge welding system the combination with a first condenser, means for charging the condenser, a transformer having primary and secondary windings, means for connecting a load across the secondary winding, a first switching means for connecting the condenser across the primary winding to discharge the condenser therethrough, and means for actuating the switching means when a load is connected across the secondary winding, of means for controlling the quantity of electrical energy discharged from the condenser to the load comprising a second, normally uncharged condenser having a high capacitance compared to that of the first condenser, second switching means for connecting the condensers in parallel, means operative during the discharge of the first condenser at a preselected time after the first switching means is operated, for actuating the second switching means, and an impedance connected across the second condenser for neutralizing the charge transferred thereto from the first condenser.

2. In a condenser discharge welding system the combination with a first condenser, means for charging the condenser, a transformer having primary and secondary windings, means for connecting a load across the secondary winding, a first gaseous discharge tube connected in series with the condenser and the primary winding, and means for igniting the tube to discharge the condenser through the transformer when a load is connected across the secondary winding, of means for controlling the quantity of electrical energy discharged from the condenser to the transformer comprising a second, normally uncharged condenser having a high capacitance compared to that of the first condenser, a second gaseous discharge tube serially connected to the second condenser, means connecting the second condenser and second tube in parallel with the first condenser, means including a timer for igniting the second tube to provide a conductive path between the condensers and means responsive to the igniting means for the first tube for triggering the timer to operate at a predetermined time during the discharge of the first condenser.

References Cited in the file of this patent

UNITED STATES PATENTS

| | | |
|---|---|---|
| 2,356,765 | Klemperer | Aug. 29, 1944 |
| 2,440,247 | Dawson | Apr. 27, 1948 |